United States Patent [19]

Arps et al.

[11] 4,028,731

[45] June 7, 1977

[54] APPARATUS FOR COMPRESSION CODING USING CROSS-ARRAY CORRELATION BETWEEN TWO-DIMENSIONAL MATRICES DERIVED FROM TWO-VALUED DIGITAL IMAGES

[75] Inventors: Ronald Barthold Arps, Stanford, Calif.; Lalit Rai Bahl, Amawalk; Arnold Weinberger, Poughkeepsie, both of N.Y.

[73] Assignee: International Business Machines Corporation, Armonk, N.Y.

[22] Filed: Sept. 29, 1975

[21] Appl. No.: 617,906

[52] U.S. Cl. .............................. 358/260; 358/261
[51] Int. Cl.² ...................................... H04N 7/12
[58] Field of Search .................. 178/6, DIG. 3; 358/260–263; 340/347 DD

[56] References Cited

UNITED STATES PATENTS

| | | | |
|---|---|---|---|
| 3,185,823 | 5/1965 | Ellersick | 340/347 DD |
| 3,185,824 | 5/1965 | Blasbalg | 340/347 DD |
| 3,813,485 | 5/1974 | Arps | 358/261 |
| 3,927,871 | 2/1976 | Robinson | 358/261 |

*Primary Examiner*—Robert L. Griffin
*Assistant Examiner*—Edward L. Coles
*Attorney, Agent, or Firm*—R. B. Brodie

[57] ABSTRACT

An apparatus is disclosed for compressing a $p \times q$ image array of two-valued (black/white) sample points. The image array points are serially applied to the apparatus in consecutive raster scan lines. In response, the apparatus simultaneously forms two matrices respectively representing a high order $p \times q$ predictive error array and a $p \times q$ array of location events (such as the raster leading edges of all objects in the image). Improved compression is achieved by selecting between the more compression efficient of two methods for encoding the position of errors in the prediction error array. These alternative methods are conventional run-length coding and a novel form of reference encoding, used selectively but to significant advantage. Thus, a run-length compression codeword is formed from the count $C$ of non-errors between consecutive errors (in response to the occurrence of each error in the $j$th bit position of the $i$th scan line of the predictive error array) upon either $C \leq T$, where $T$ is a threshold, or $C > T$ and there being no occurrence of a line difference encoding for the error (where $i, j, C$ and $T$ have positive integers). A line difference codeword with difference value $v$ is generated upon the joint event of $C > T$ and either the single or multiple occurrence of location events in the $i$th-1 scan line of the location event array within the bit position range of $B \leq r \leq (j+n)$, where positive integer $B$ is the greater of function $D(T,v)$ and $(j-n)$, and the number of intervening location events, $s$, within the bit position range of $D(T,v) \leq q < (j-n)$ not exceeding some limit $m$ (where $m, n, q, r$ and $s$ are positive integers).

11 Claims, 12 Drawing Figures

COMPRESSION MODE BLOCK DIAGRAM (DATA FLOW)

DECOMPRESSION MODE BLOCK DIAGRAM (DATA FLOW)

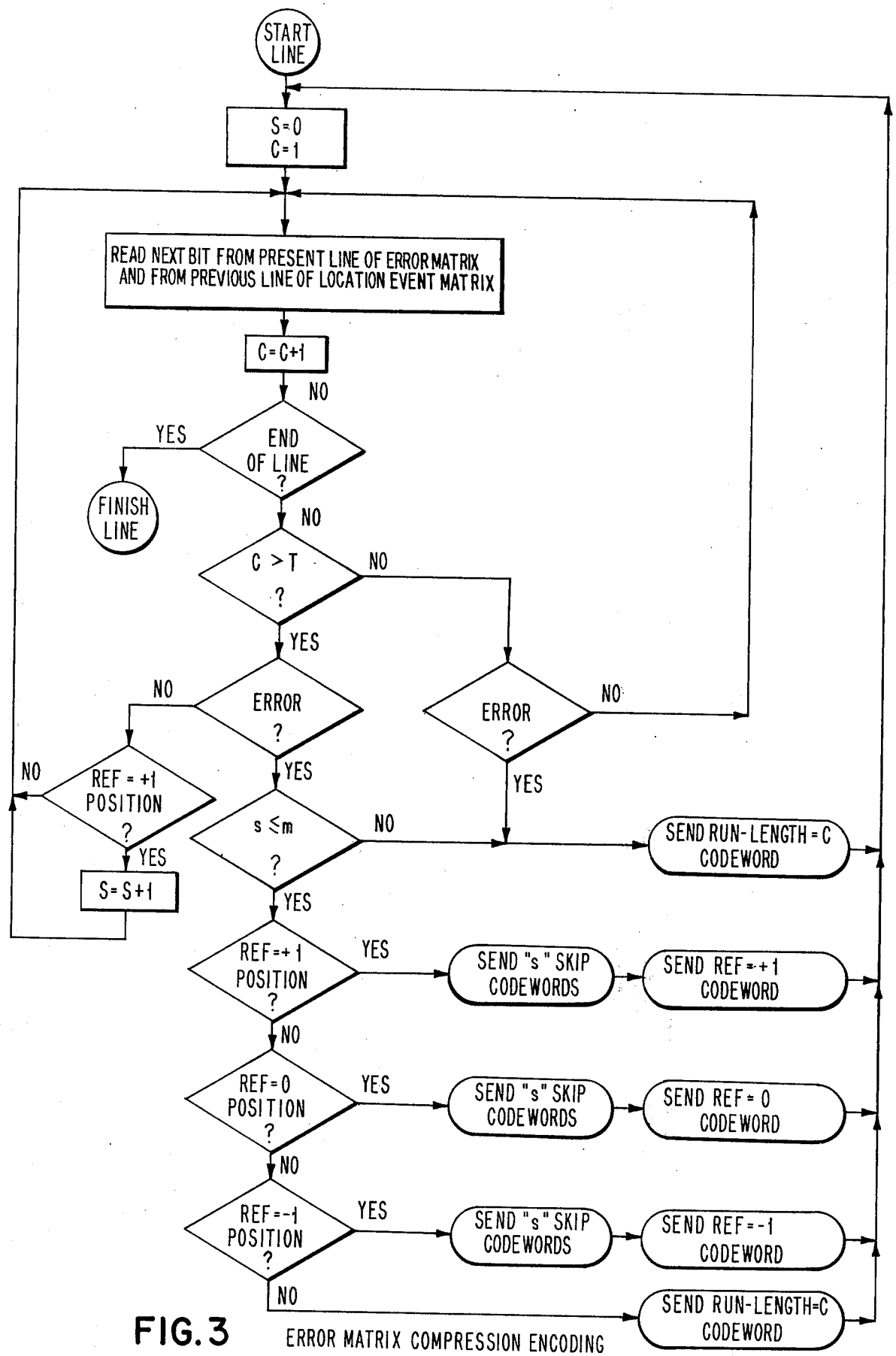
FIG.3 ERROR MATRIX COMPRESSION ENCODING

ERROR MATRIX DECOMPRESSION DECODING

ENCODING SELECT LOGIC

RASTER MATRIX GENERATOR

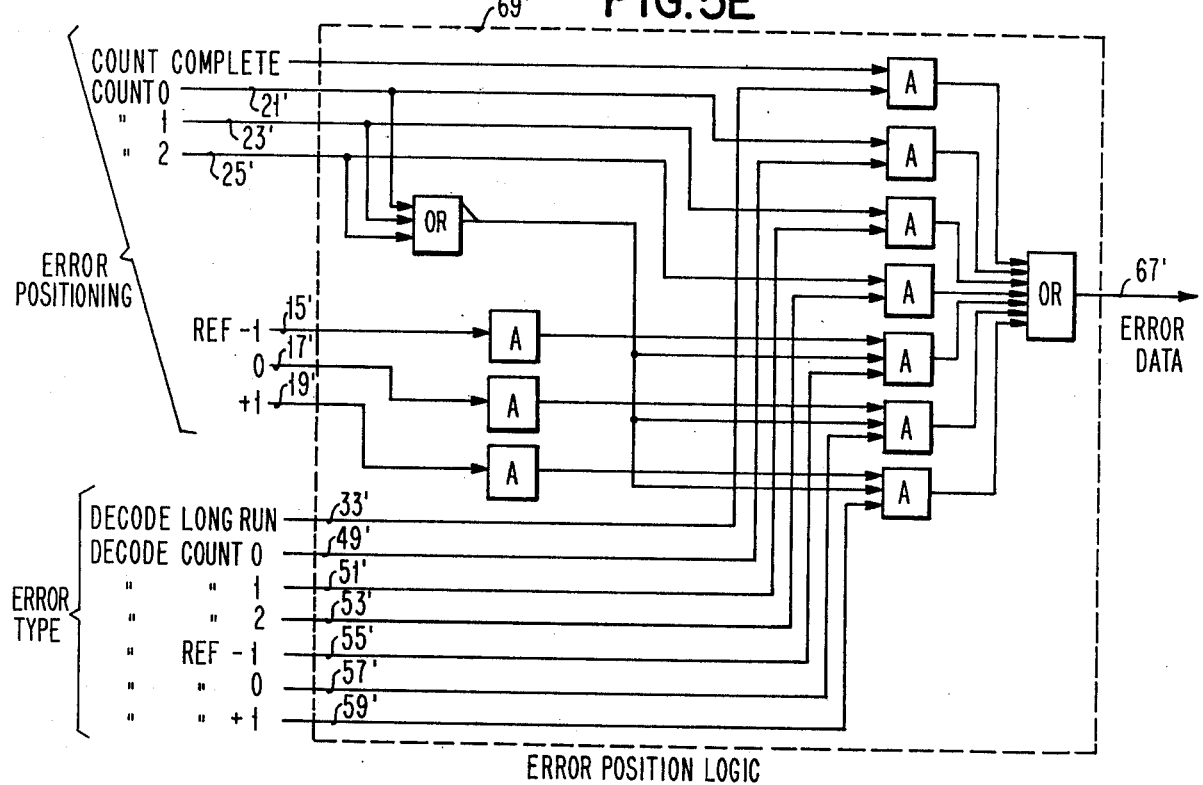

APPARATUS FOR COMPRESSION CODING USING CROSS-ARRAY CORRELATION BETWEEN TWO-DIMENSIONAL MATRICES DERIVED FROM TWO-VALUED DIGITAL IMAGES

BACKGROUND OF THE INVENTION

This invention relates to the compression of two-dimensional black/white pictures normally coded as a $p \times q$ array of two-valued sample points and, more particularly, to improvements in the compression of such images using predictive/variable-length encoding techniques.

It is well appreciated that run-length encoding of black and white sequences could be performed directly on the Boolean values of the sample points or picture elements (pels) constituting a two-dimensional array representative of the image taken in row major order. In general, run-length encoding can be thought of as a form of relative addressng occasioned by the use of an index plus relative count. Passing the image into runs is accompanied by variable length encoding of each run with an independent codeword. The compressed size of an image is then the product of the number of codewords (runs) and the average codeword length.

The question arises as to what effect, if any, would there be upon run-length encoding if the distribution of runlengths of blackness or whiteness of two-dimensional encoded arrays representative of the original picture could be altered. Assuming black data on white background, consider that a page of alphanumeric text consists of approximately 90% white pels and 10% black pels. When such a page of text is scanned in row major order, i.e., consecutive raster scan lines, one counts a large number of white pels and very few black pels. The distribution of run-lengths of black typically peak at around a length of 2, whereas the distribution for white runs typically peaks at around a run-length of 15. In contrast, the complement or negative image of the same page of alphanumeric text will have approximately 90% blackness and 10% whiteness. Furthermore, the position of the peaks in its run-length distributions will have reversed to typically 15 and 2, respectively. Similarly, changes in sampling resolution for a given graphic image cause significant changes in the run-length distributions. For black text on a white background, the peak in black run-length distribution represents the average stroke width in the type on the page. This peak will shift as you change the sampling interval. Optimal coding of this kind of data requires run counting and encoding of black and white sequences separately and, perhaps, adaptively. It would simplify run-length encoding if one could bleach out som of the blackness so that all transformed image arrays would contain only a few black pels with adjacent black pel pairs as a near-rare event. Then, one would really have to only run-length encode sequences of white pels by implicitly assuming the existence of one black pel at the end of each run. Consecutive black pels could be represented as white pel runs of length zero. This method eliminates the need for separate variable-length encoders for black and white runs. It also halves the number of runs to encode by essentially eliminating the encoding of black runs. If the reduction in blackness is accomplished without doubling the number of white/black run pairs, then the above rare-event coding results in an overall reduction in the number of codewords per image and thereby the compressed image size as well. Such a process of bleaching out in an image can be achieved by the process called "predictive encoding".

Predictive coding according to J. S. Wholey, "The Coding of Pictorial Data", *IRE Transactions on Information Theory*, April 1961, pages 99–102, involves a multi-step process. It is based upon the ability to predict the black or white value of the next pel in any given scan line based upon the black or white cluster of pels in neighboring positions usually in the same or immediately preceding scan lines. What then is actually encoded is only the non-correspondence between the predicted and actual pel value. Now, as a predictor takes into account more past history, then the accuracy of the predictions should improve (although with diminishing incremental effectiveness). This means that a number of neighboring pels in the same and previous scan lines would be used to predict the pel values. A predictor using only the $j$-1 pel value for predicting the value of the $j$th pel would be spoken of as a first-order predictor. A third order predictor might consist of the $j$-1 pel value for the ith scan line and the $j$-1 and $j$th pel for the $i$th-1 scan line. A third order predictor thus consists of a cluster of three neighboring pels with $2^3$ or eight different states in order to obtain a prediction function, that is, a table in which each of the possible 3-pel states predicts the pel value (black/white) which is most likely to follow it. In contrast, a single-order predictor can only predict based upon two possible states. The effect of serially applying the $pq$ Boolean values of a $p \times q$ array of two-valued sample points in row major order to a predictor is to transform the matrix into another $p \times q$ matrix in which each point represents correspondence or non-correspondence between the actual and predicted values. Typically, 1 represents noncorrespondence or error between the values and 0 represents correspondence or no-error. Thus, the array generated by a higher-order preidictor would have a smaller percentage of 1's (blackness) than a low-order predictor. Note that this transformation is a 1:1 mapping and results in no data compression of itself. However, it less than doubles the number of white/black run pairs as well as reduces the overall blackness and, hence, corresponds to the aforementioned bleaching. The run-length encoding of runs of whites or 0's between the occurrence of 1's in the "error matrix" is described by Wholey in his article and by Arps in U.S. Pat. No. 3,813,485, issued May 28, 1974. This is characterized as predictive/run-length encoding. As described by Arps, exhaustive, non-casual predictive encoding looks at adjacent points on previous lines and preceding points of the present line in order to predict for all possible states the two-level value of the next pel. If the prediction is in error, a binary 1 is transmitted. Alternatively, if the prediction is correct, a binary 0 is transmitted. Run-length coding is used to specify the run-lengths of binary 0 non-errors and thereby to implicitly locate their accompanying binary 1 errors. Restated, the coding process boils down to describing where binary 1 errors occur; and one initiates a run count based on the occurrence of an error indication from the predictive encoder, continuing the count of non-errors until the next error output is encountered.

The most pertinent prior art is set forth in H. E. White et al in an article entitled, "Dictionary Lookup Encoding of Graphics Data" appearing in the anthology by T. S. Huang and O. J. Tretiak, *Picture Bandwidth Compression*, Gordon and Breach Science Publishers, New York, 1972, LC74-135062, 1972, at pages 267–281. This article proposes to increase the compression obtained by first-order predictive/run-legnth encoding of a two-valued image by the addition of an alternative coding method called "reference coding". In this method, 1-pel prediction errors are coded whenever possible by locating them with respect to nearby 1-pel prediction errors in the immediately previous line (rather than by locating them with respect to the immediately preceeding error in the present line as with run-length coding). Three reference codewords are defined, specifying error locations below a previous line prediction error as directly below or one pel to the left or right from directly below. Note that reference coding is not always possible and that run-length coding must be used as a backup for combinations that it cannot handle (such as prediction errors without nearby errors available in the preceding line).

SUMMARY OF THE INVENTION

It is an object of the invention to improve the compression of two-dimensional, two-valued images normally coded as a $p \times q$ array of Boolean sample points and, more particularly, to improve the compression of such images using any one or combination of predictive, reference or run-length encoding techniques. It is a related object to devise an apparatus whose compression efficiency is substantially invariant to statistical differences among different black/white graphic images and their complements while exceeding the compression capability provided by the above techniques. For example, statistical differences exist between pages of alphanumeric text characterized by 90% white pels and 10% black pels with mostly long runs of white and short runs of black, and the negative images of such text with approximately 10% white and 90% black pels with a high frequency of short runs of white and long runs of black. Also, statistical differences occur as you change the sampling resolution for a given black on white image.

The above objects are satisfied by an apparatus using a technique called "cross-array encoding". Signals representative of the original image array points are serially applied to the apparatus in consecutive raster scan lines. In response, the apparatus forms a $p \times q$ array representing high-order prediction errors. It simultaneously forms an auxiliary $p \times q$ array of detected features or location events such as the raster leading edges of all objects in the original image array. In this apparatus, the non-error run lengths between consecutive errors in each raster scan line of the prediction error array are run-length coded. At the same time, the reference coding method also locates these error with respect to the location event matrix.

It is appreciated that the compressed size of an image is the product of the number of codewords and the average codeword length. In the prior art, predictive coding is directed primarily at reducing the number of codewords, whereas reference coding is directed at reducing the average codeword length. White et al tried to reduce both simultaneously without cross-array encoding and found themselves limited to 1-pel prediction. The introduction of a separate location event matrix enables us to minimize the number of codewords and average codeword length, at the same time. Reference coding is done with respect to this auxiliary matrix, rather than locating the prediction errors with respect to prior errors within the same matrix. The location event matrix and the reference coding then independently are optimized to reduce the average length of codewords. This frees one to increase the prediction to higher orders, in the error matrix, thereby simultaneously reducing the total number of codewords per image.

For the algorithm of this invention, a set of decision rules are used to invoke run-length of reference coding. For short runs up to some threshold length, T, run-length coding has priority. Thereafter, run-length coding is only used when reference coding is not feasible. Stated more precisely, a run-length compression code word is formed from the run-length count C of non-errors between consecutive errors (in response to the occurrence of each error in the $j$th position of the $i$th scan line of the predictive error array) upon either $C \leq T$, where T is a threshold, or $C > T$ *and* there being no occurrence of a line difference encoding for the error (where $i, j$, C and T are positive integers). A line difference codeword with difference value $v$ is generated upon the joint event of $C > T$ *and* either the single or multiple occurrence of location events in the $i$ th-1 scan line of the location event array within the bit position range of $B \leq r \leq (j+n)$, where positive integer B is the greater of function $D(T,v)$ and $(j-n)$, and the number of intervening location events, $s$, within the bit position range of $D(T,v) \leq q < (j-n)$, not to exceed $m$ (where $m, n, q, r$ and $s$ are positive integers). By adding the reference codewords to a conventional run-length code word set, the compression code word relative frequency distribution is improved at only a small increase in alphabet size. This improvement causes more peaking of the relative frequency vs. codeword size distribution with a resulting lower entropy per code word.

The apparatus of the invention may be summarized in other that algorithmic terms by considering the compression process as being formed from prediction encoding, run-length encoding, reference encoding using a location event array and code selection. To begin the compression process, the pel valve of each incoming pel is predicted based upon the pel values of the neighboring, previously processed pels. In the preferred embodiment, the preceding pel in the current scan line and the two adjacent pels in the previous scan line are used to form a third order, three-pel predictor. The output valve of the predictor is compared by an exclusive OR logic gate with the value of the current incoming pel. If they are the same, a zero bit is passed on to be further encoded. If they are different, a prediction error has been made an a 1 is passed on for processing. This prediction error image is a one-to-one transformation of the original image into a form that makes encoding more efficient. Some of the resulting characteristics from the predictive process are that (1) error images have less black in them than the original and (2) the error images encode more consistently by being less subject to variations caused by scanning resolution, the scanning of complement or negative images, or the scanning of solid black regions.

The prediction error array from the output of the exclusive OR gate previously mentioned is first encoded by counting the number of zeros between each successive pair of 1's. The variable length overflow counting used results in a compressed run-length code for the position of the current prediction error relative to the immediately preceding error.

In this invention, prediction errors can also be encoded by locating a pel relative to a general location event array also derived from the original array such as a matrix of first order prediction errors or the preferred embodiment of a matrix of raster leading edges. The means for performing the function termed "reference encoding" preferably is run concurrently with the run-length encoding process. Each predictor error can generally be located by its position relative to a previous line location event; but this reference encoder only looks for a nearby location event when a prediction error has been received to be encoded. In fact, only those prediction errors that are directly below, one pel to the left or right of directly below a location event are includable in the preferred embodiment where $n \times 1$. However, ambiguity arises for a decompressor if one or more location events occur after the previous prediction error and the location event used to encode the current prediction error. This is because it attempts to reconstruct the position of a reference-encoded error with respect to a location event after the last decoded error position, but it doesn't know which event the compressor actually used. Some prearranged scheme is needed for skipping past "intervening" location events to the event actually used by the compressor. If the skipping of location events is done by use of a special SKIP codeword, reference encoding may still not be used when the number of intervening SKIPs exceeds some limit $m$. If the prediction error is not reference encodable with a location event, it must then be encoded using the run-length encoding technique. For the preferred embodiment, the location event array of raster leading edges works best with $m=0$ and no use of SKIP code words. In this case, only if a reference with no intervening events can be established, will an unambiguous reference code be generated that describes the positional relationship of the error to a location event.

Note that when a prediction error occurs, the apparatus of the invention must, in general, select one of two compression code words. In this case, the most compression efficient selection from the available code words will be used. By compression efficient encoding, we mean the selection of codewords yielding the least number of compressed bits when considering their length and all other codewords whose length they effect. In or algorithm, this effect on other codewords gives rise to the definition of a run-length threshold, T, below which run-length codewords have priority. By always using such a threshold, we totally eliminate reference encoding (and the use of location events) up to some related position $D(T,v)$ in the preceding line. This means that when we do use reference encoding the search for location events can start after $D(T,v)$, avoiding the costs from some intervening events (that give rise to SKIP codewords or force run-length encoding if $s>m$). The costs we have avoided through bypassing all intervening events up to a prearranged threshold more than compensate for any additional bits resulting from the mandatory use of run-length coding up to that threshold. The short runs that result are typically frequent enough that they have codewords almost as short as the reference codewords being supplanted. This set of decision rules based on T and $D(T,v)$ represent our embodiment for making the code words in this algorithm maximally compression efficient. In the preferred embodiment we have selected the relationship $D(T,v)=(j-C+T+1)$, dependent on T, but independent of $v$ for simplicity. At the end of each scan line, an implicit end-of-line (EL) encoding is used that takes advantage of the cross-array correlation coding. To accomplish this, we add an extra column of all 1s dummy data to both the error and location event arrays at both the compressor and decompressor. These independent dummy columns follow the array column corresponding to the last pel position in each $p \times q$ array. Each scan line is thereby extended slightly and a colum of artificial reference encodings is generated beyond the end of the input image data. In the preferred embodiment, these all 1 location event and error array dummy columns occupy identical column positions yielding potential reference codewords for interline corrections of 0.

The decision rules for reference or run-length encoding apply as before but now cover these extended arrays. The result is that most scan lines that would otherwise end in a long runlength codeword now can be encoded at the end of a line with a short reference codeword. These above processes are repeated throughout each line of the original image array unit it is entirely encoded.

The decompression process for reconstructing the original array from the compressed image can be considered as a combination of run-length decoding, reference decoding with a location event array, and prediction decoding. Note that the prediction process and the location event generation process for decompression are identical with those to be found in compression.

BRIEF DESCRIPTION OF THE DRAWING

FIG. 3 is a functional flow diagram for error matrix compression encoding according to the embodiment set forth in FIG. 1.

FIGS. 5A-E show a detailed logic implementation of error matrix generator 12, location matrix generator 16, encoding select logic 69, raster matrix generator 12', and error position logic 69'.

Figure 4:
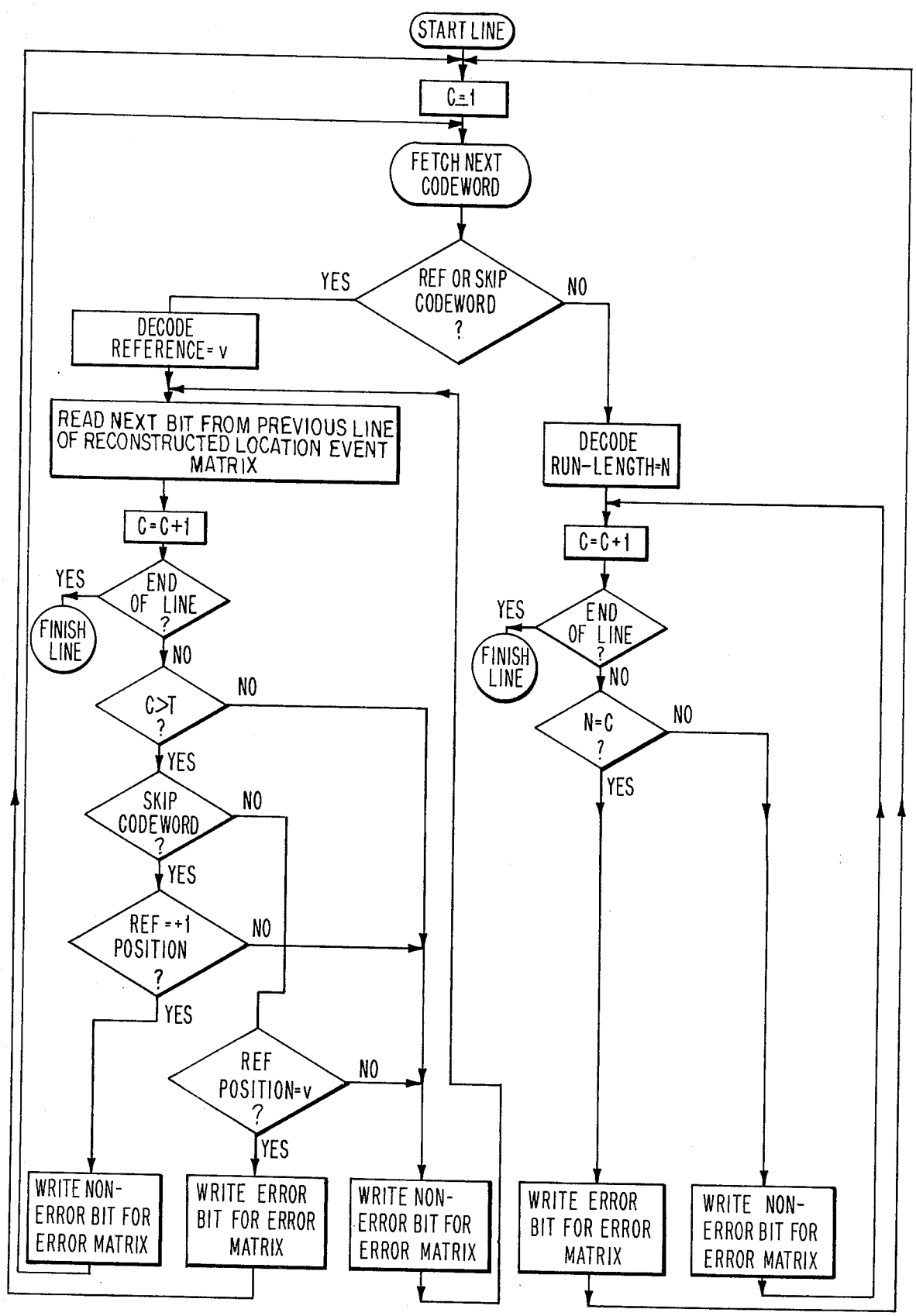
FIG. 4 shows a functional flow diagram for error matrix decompression from the compressed data according to the embodiment shown in FIG. 2.

With the exception of FIG. 3 and FIG. 4, all drawings are restricted to describing the preferred embodiment, with parameter settings $D(T,v)=(J-C+T+1)$, $T=2$, $m=0, n=1$, 3rd order pel prediction and the use of raster leading edges for location events.

DESCRIPTION OF THE PREFERRED EMBODIMENT

Figure 1A:
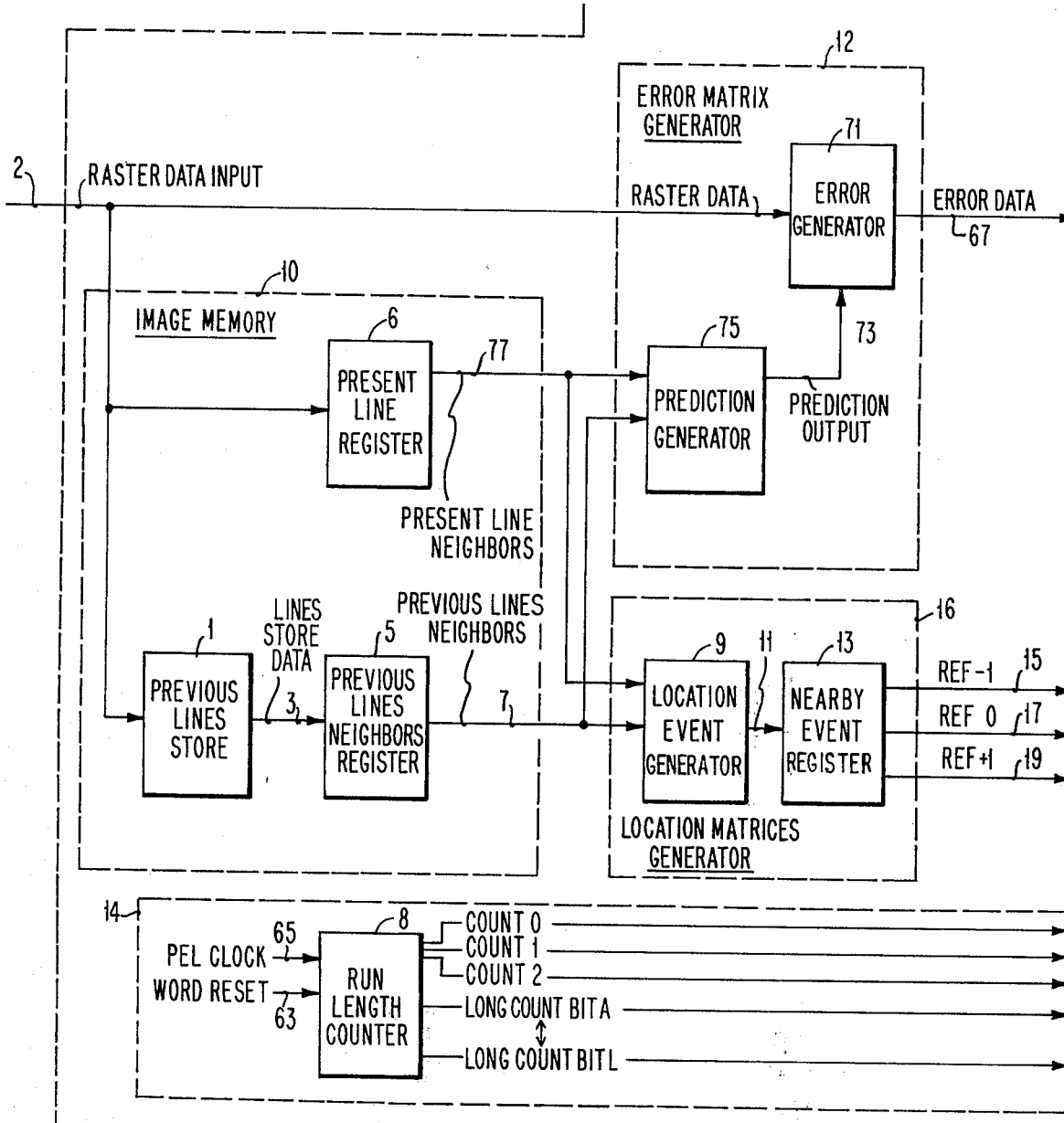
FIGS. 1A and 1B set forth the system logic and data flow for the cross array compression of a two-dimensional matrix of two-valued sample points involving four functional groupings consisting of image memory, error matrix generation, location matrix generation, and cross array comparison and compression encoding means.
Figure 1B:
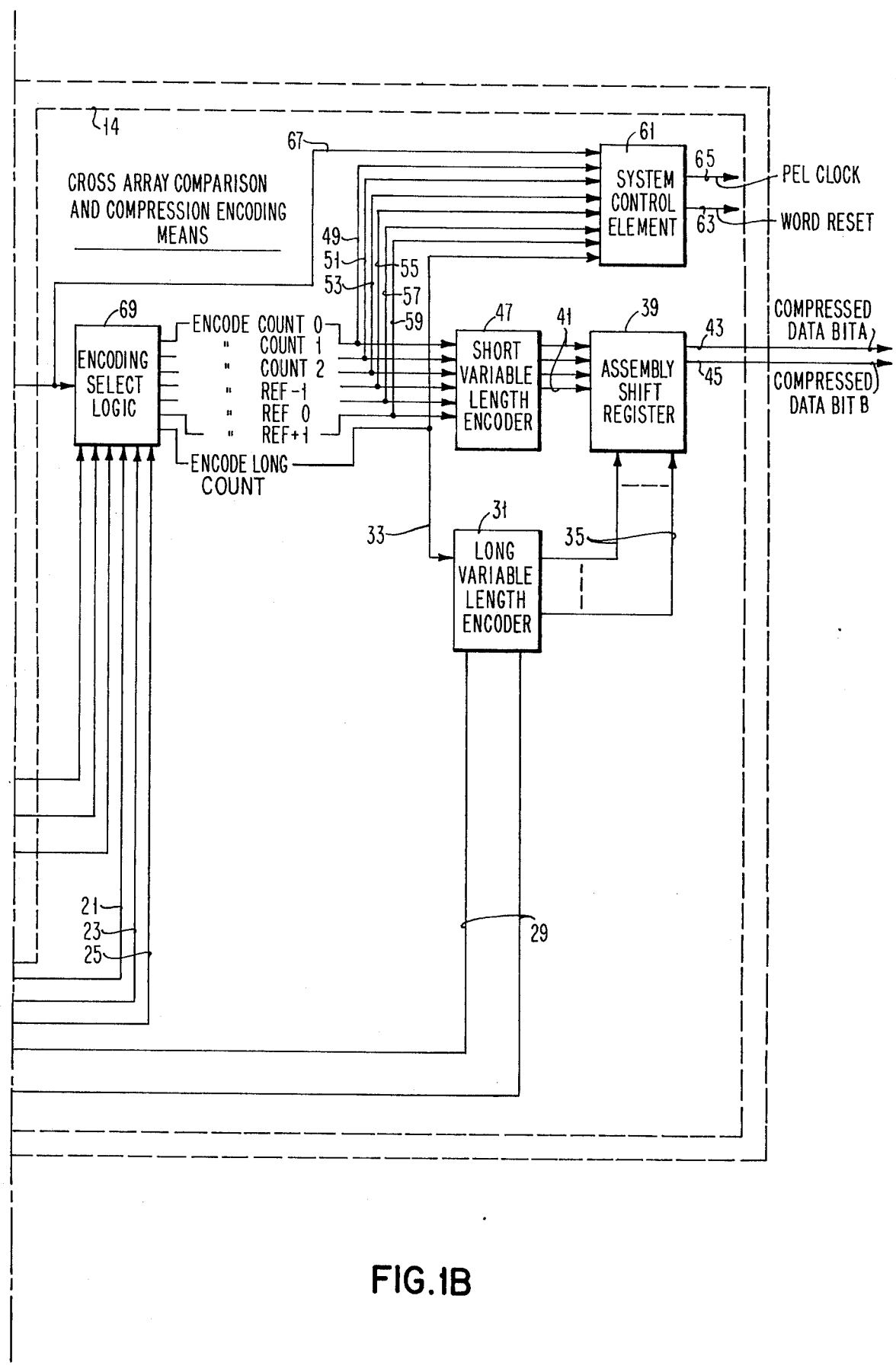

Referring now to FIGS. 1, there is shown a system logic and data flow diagram for the cross array compression of a two-dimensional matrix of two valued coded points. A raw image of $p \times q$ array of two valued coded points is serially applied to the apparatus in consecutive raster scan lines on input path 2. Each pel value on path 2 serves as an instantaneous input for error matrix generator 12 and image memory 10. Image memory 10 stores the present and a predetermined number of previous raster scan lines representative of at least a selected portion of the $p \times q$ original array.

Error matrix generator 12 and location matrix generator 16 also generate $p \times q$ arrays derived from the original $p \times q$ image. Error generator 12 provides a $p \times q$ array of 1's and 0's respectively representing any given array location $i, j$, the non-correspondence between the predicted value from prediction generator 75 and the instantaneous pel value appearing on line 2 as determined by error generator 71. Location event generator 9 responsive to the present and previous line neighbors respectively over paths 77 and 7 from image memory 10 provides a $p \times q$ array of 1's and 0's representing the presence or absence of location events. Nearby event register 13 transforms this to separate $p \times q$ arrays for the different interline correction values $(-1, 0, +1)$ over paths 15, 17 and 19, respectively, which are also the outputs for the total location matrices generator 16.

Cross array comparison and compression encoding means 14 includes encoding select logic 69 responsive to error data from error generator 12, the location references encodings from location generator 16 and run-length count data from counter 8 over paths 21, 23 and 25. Parenthetically, the run-length coder is initiated and controlled by system control element 61 over paths 65 for the pel clock and 63 for word reset.

Comparison and encoding means 14 must decide by comparing with two derived matrices whether to variable length encode the runs of error data 0's between error data 1's or encode error data 1's by reference coding to location events on the basis of which of the two codes possesses more compression efficiency. Note that the encoding select logic 69 directly drives variable length encoder 47 so that the action of logic 69 results in the direct generation of a compression code word from encoder 7 for assembly in output shift register 39 over path 41. Note also in the generation terms that the encoding events of interest are initiated by an error from the error matrix generator 12 with the run length count and reference encodings being involved in the decision by their direct coupling to select logic 69. In the event that a long run-length count needs to be encoded, select logic 69 initiates transfer of the contents of run-length counter 8 through variable length count code transfer logic 31 over paths 29 and 35 to assembly shift register 39.

In the preferred embodiment, compressed data is organized on dubit boundaries consisting of two consecutive bits. The word length is variable with a minimum of one dubit, i.e., one subword, to a maximum of nine dubits per codeword. Words are separated based upon receipt of a uniquely coded variable-length subword combination.

In addition to the preservation of compressed word boundaries, additional special control words are necessary to manage the transmission, storage, and decompression of compressed information. Since we are using overflow run-counting as described in the aforementioned patent by Arps, there are some extra states available for encoding special words. An example of such a control word in the preferred embodiment is that of an Uncoded Line (UL) control word. This is indicative of the fact that the line of data to follow is not compressed and will be separated from the continuation of compressed data by having a prearranged length. The storage/transmission of uncompressed data from a compression apparatus is necessitated where compression and coding would actually expand, rather than compress a data stream. For this reason, by sending uncoded raster data preceded by the UL codeword, the system compresses at a ratio of only slightly less than one-to-one. Another control word denominated Fill Word (FW) is used when it is necessary to maintain a uniform flow and compression is so great that not enough codewords are being generated of coded data. Lastly, End of Page (EP) is a control word indicative of the last line of compressed data in an image.

It should be appreciated that Laemmel, "Coding Processes for Bandwidth Reduction in Picture Transmission", Report R-248-51, PIB-187, Polytechnic Institute of Brooklyn, New York, Aug. 30, 1951, at pages 21-33, first described the use of inter-line correlation for compression of raster scan black/white images. Laemmel remapped the strokes for picture lines constituting characters or graphic data into just their outlines or border elements. He then used the assumption that these borders were vertical, or at least straight, in order to arrive at a predicted position for them in the present scan line based upon their position on the lines immediately preceded. Only the errors in these position predictions were transmitted by specifying the correction in terms of pels required to arrive at their actual location. These corrections were positive or negative integers. The termination of an existing border was indicated where it occurred by imbedding a special code word within the string of location corrections. The starting positions of new borders were transmitted after all corrections and terminations using an absolute position from the start of the scan.

Gorog et al in "An Experimental Low-Cost Graphic Information Distribution Terminal", 1971, *SID International Symposium Digest*, May 1971, pages 14 and 15, restricted the prediction of border point positions to assuming only vertical borders, along with restricting the set of possible corrections to only $-1$, 0, or $+1$ pels. Corrections outside of this range were represented by Gorog by conventional run-length coding, using the relative location of a border point from the last previously coded border point in the same scan line. The termination of an existing border (to avoid ambiguity during decompression) was not explicitly indicated, but rather resulted in run-length encoding of the next border point as did the start of a new vertical border. He denominated his technique as "reference encoding". This technique took advantage of the fact that almost all border points could be encoded by referencing to the previous line with the only three correction codes. The simplification of Laemmel's algorithm still yielded a low-entropy-per-border point and a low-page entropy.

The number of border points as well as their entropy combine to determine the page entropy. A reduction on either of these components will improve the page compression ratio. The border points used by Laemmel and Gorog were recognized as the errors from first-order, previous pel state predictions, that is, the state of the present pel is predicted to be the same as the pel immediately preceding and errors represent the stroke edges on border points.

In the apparatus of this invention, the number of prediction errors are reduced by generalizing and using higher-order state predictors. These errors are encoded using a limited set of $2n+1$ possible interline corrections backed up by run-length coding. In the preferred embodiment of this invention, $n=1$ and "referencing" means an encoding based upon a $-1$, 0, or $+1$ pel correction in position from the previous line.

It is to be understood that, for example, if a solid black circle were embedded in the middle of a white background, then the $p \times q$ array representative of the first-order prediction errors would consist of 0's everywhere in the array field, but for the outline or border of the figure. If a donut-shaped object were in the field, then both the exterior and interior borders represented by 1's at appropriate positions would be preserved in the first-order prediction error array.

It was unexpectedly observed that higher-order prediction errors invariably clustered near the continuous borders defined by a simultaneous generation of first order prediction errors. Thus, the location of errors from higher-order prediction in a present scan line could now still be derived using reference encoding from knowing the location of first-order errors or other location events in the previous scan line, together with an appropriate correction, e.g., $-1$, 0, $+1$. Having decreased the number of errors to encode by using high-order prediction, it is desirable in the invention to introduce a special SKIP code word indicative of skipping past the more plentiful previous line location events in order to redefine that event which is next.

In Gorog, referencing is only allowed to the next location event in the previous line. When an intervening termination of a vertical border leaves an extra intervening event in the previous line, reference encoding must be replaced by run-length encoding. Since errors encodable with reference to a preceding line event are always also encodable using a run-length in the present line, a new trade-off is possible. When runs are short and the run-length codeword that could be used is small compared to a reference codeword, it is desirable to have a rule of action that gives priority to encoding in runs and simultaneously ignores all next location events for some arbitrary distance, say, T bits in the previous line. Such a rule permits the starting point for beginning a search for the next location event to be moved by T. Consequently, some errors can be encoded using fewer SKIP codewords. For the preferred embodiment, T=2 the maximum number of consecutive SKIP codewords, $m$, has been chosen to be zero and SKIP is not used. By use of T, some errors can still be reference encoded which would otherwise have been encoded as run-lengths. One example illustrating this is where a previous line location event within T pels of the last error would have been the actual next event, but instead the error to be encoded is below the first event beyond T and can still be reference encoded. By such a rule, extra reference encodings are picked up and more short code words are used overall.

The starting point $D(T,v)$ to establish a next previous line location event can, in general, be different for all the different inter-line correction values, $v$. In the preferred embodiment, however, for simplicity, we have selected this starting point to be moved only by T and not a function of 0 for all cases. It is necessary that priorities also be established for which referencing to use when more than one is possible. In all cases, to minimize SKIPS, one gives priority to the available reference with the most positive integer value.

In general, the leading edge boundaries of strokes are a useful set of location or reference events (in a left-to-right raster scan, these leading edges are left-hand edges). Leading edge boundaries constitute one-half of the available first-order errors and are generally within a stroke width of any higher-order errors. If the stroke width is less than T pels, the errors to be encoded near a trailing-edge boundary will always be run-length encoded with a short run-length code word. The next location event beyond T will then be at the following leading edge without intervening events, ready to provide a short reference code word for errors near that leading edge boundary.

Referring now to FIGS. 1 taken together with FIG. 3, there is shown a flow diagram for the compression coding events of interest. The driving force in this operation is the output from error matrix generator 12. Assuming the system is initialized and beginning at a new scan line, it is clear that run-length counter 8 is incremented by the pel clock 65 upon the application of each synchronized picture element or pel bit on raster data input line 2. This continues until a third-order prediction error is detected from the error data 67 by the system control element 61 and the encoding select logic 69. Upon detection of a third-order error, if the count C from run-length counter 8 is less than or equal to a threshhold value T ($C \leq T$), then this short run-length is sensed from counter 8 and transformed into an encoding command by encoding select logic 69, which is, in turn, received by short variable length encoder 47 and transferred to assembly shift register 39. If C>T, then the issue is, does there exist one or more location events from location event generator 11 from the previous scan line within one pel of the third-order prediction error in the present scan line. This is ascertained in the encoding select logic 69 by monitoring the nearby event register 13 outputs 15, 17 and 19. If the answer is negative, then the count in counter 8 is encoded through long variable-length encoder 31 to shift register 39. If, indeed, there are one or more such location events but also intervening location events in the previous scan line between the threshold T and one pel before the position directly above the error pel being encoded, then the long run-length count in counter 8 is again sent to the shift register. Otherwise, a location event is encoded using a reference event code word, and if there are multiple location events, then a reference event code word is used based upon a priority rule that specifies encoding the reference with the most positive interline correction value.

Image memory 10 is formed from a multi-element buffer in which the pel values of a present scan line are stored in present line register 6 and the pel values of previous scan lines are stored in previous lines store 1. Since the generation of either high-order prediction errors or location events such as leading edges can, as a matter of design choice, embrace the pel values of many consecutive prior scan lines, the organization of image memory in this invention is illustrative rather than limitive. The only essential difference between matrix generators 12 and 16 is in the information they seek to derive from original image.

Figure 2A:
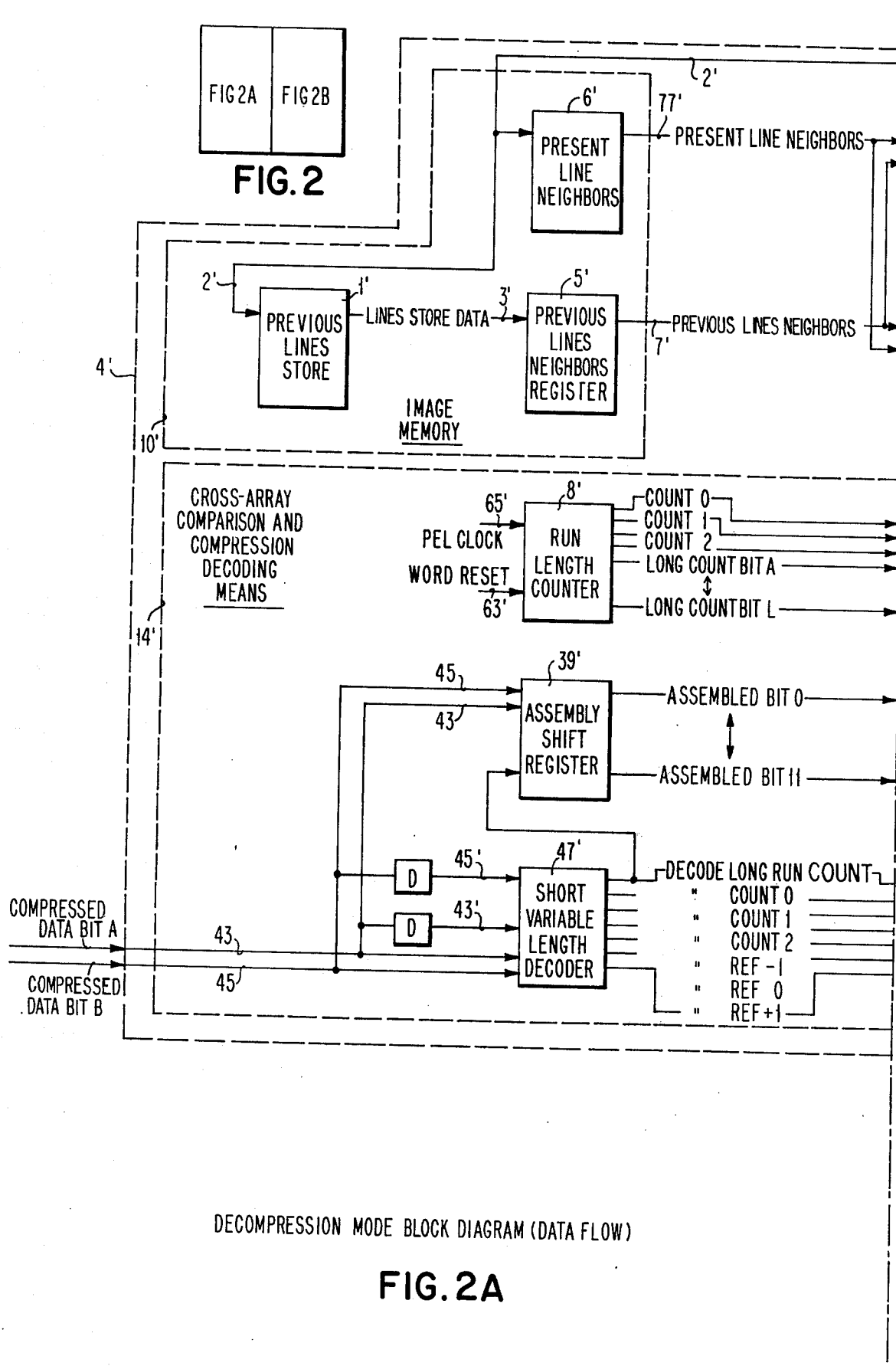
FIGS. 2A and 2B represent the system logic and data flow for decompression of compressed data into a full blown two-dimensional matrix of two-valued picture points.
Figure 2B:
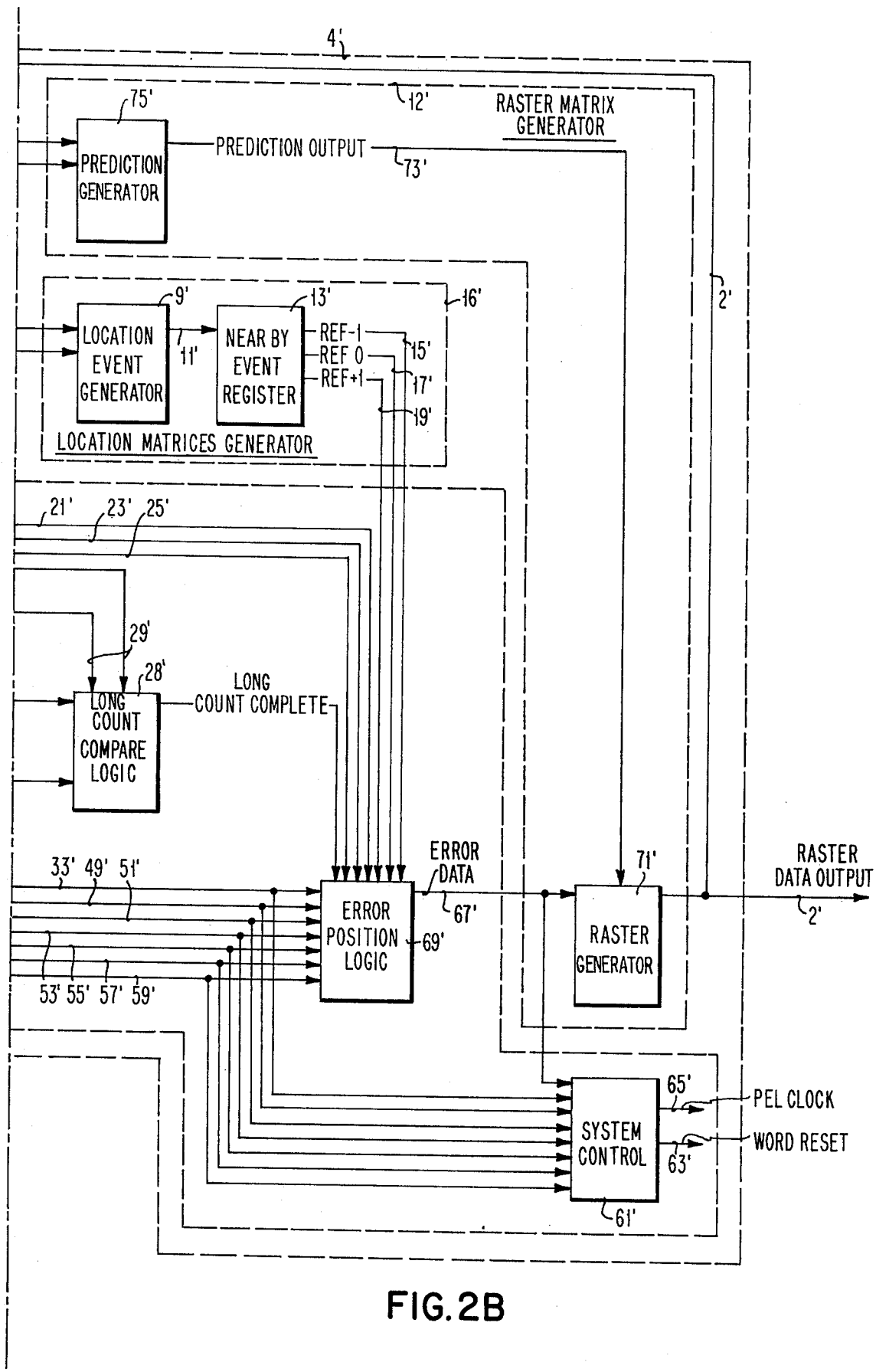

Referring now to FIG. 2, there is shown a system logic and data flow diagram of a decompressor according to the invention. Whereas compression relates to the functions of prediction, run-length encoding, reference encoding, and compression code selection; decompression involves run-length decoding, reference decoding, and prediction. Zero and 1 bits, representing compressed data elements, are applied to assembly shift register 39' and short variable-length decoder 47' over paths 43 and 45. The output of the short variable-length decoder consists of signals representing the beginning of a long-run codeword, the decoded value of short-run counts and decoded reference encodings −1, 0, or +1. These are applied to error position logic 69' and to system control '. Prediction generator 75' and error position logic 69' both supply 1's and 0's to raster generator 71', from which the raster data output, i.e., the original image, is obtained over path 2'. System control will generate the pel clock signal on path 65' and upon receipt of a decoded error in the error data 67' will generate a word reset on path 63'. As was the case with the compressor, the pel clock and word reset drive the run-length count 8'.

One discernible difference in the decompression organization over that of the compression is that the prediction generator 75' and the location matrices generator 16' drive the disparate logic elements raster generator 71' and error position logic 69', respectively. Another difference is that the raster data output is fed back over path 2' to image memory 10', permitting the prediction and location event generators to derive their counterpart matrices, respectively.

The prediction output on line 73' is obtained from the output of image memory 10' in the manner heretofore described for high-order prediction. It is observed that the prediction output 73' is modified by the error data obtained from error position logic 69' over path 67'. It is the case that the raster output data 2' will have the same state as that of predictor generator 75' unless there is error data appearing on path 67'. Hence, it can be said that error position logic corrects the state of the predicted output pel by producing an output that is inverse of that of the predictor output.

Error data on path 67' driving raster generator 71' is determined by error position logic 69' as a function of short variable-length decoder 47', run-length counter 8', and count compare logic 28.

Basically, a synchronous stream of 0 state error data is generated until the position of an error state 1 is determined by the decoding of a compressed codeword. If the incoming code to the decompressor has been run-length encoded, it will be recognized as run-length data by short variable length decoder 47'. The process is similar to the one described in the compression and is the inverse of the previous encoding process. The incoming run-length code is simultaneously loaded into the assembly shift register 39' and decoded by comparing it in count compare logic 28 with reference to run-length counter 8' as the pel clock from system control 61 advances the run-length count. Upon reaching the assembled count, the compare logic indicates identity and the position of an error has been located, since assembly shift register 39' was loaded at the immediately preceding prediction error and the code word count represents the relative distance to the next error.

If the incoming code is reference encoded, it will be also recognized as such and be decoded in the short variable length decoder 47'. Upon detecting a reference codeword, it is necessary to locate a prediction error either directly below, one pel to the left of, or one pel to the right of a location event. The decoded reference value 55', 57', 59' is applied to error position logic 69' awaiting coincidence with the corresponding reference to a location event form nearby event register 13'. Location event generator 9' responsive to the inputs from image memory 10' over paths 77' and 7' is continuously generating output bits indicative of whether the line directly above the error data pel that is being generated contains, for example, a left-hand edge or a first-order predictive error. The nearby event register 13' delays this data in order to simultaneously present the location events directly above and one-pel-to-the-left or right of directly above the error data pel being generated. When coincidence has occurred and the high-order prediction error has been positioned, the next high-order prediction error represented by the next codeword must be positioned and the codeword decompress process is repeated.

Referring now to FIG. 4, there is shown a flow diagram for decompression decoding. As previously indicated by short variable length decoder 47' in FIG. 2, as each codeword is received, further processing is dictated by whether or not a reference or skip (if used) code word has been received. If it is not, then it is processed as a run-length encoding. Run-length decoding consists of operating a run-length counter by successive iteration until its value C matches the codeword value N and an error bit can be generated. Until such a match occurs, the iterations result in the output 67' of non-error bits for use with the prediction generator 75' to regenerate raster data 2'. An external end-of-line condition may interrupt this process at any time (as a check, the N=C match should be true when this interrupt occurs).

A reference or skip codeword is decoded similarly with non-error bits being generated during successive iterations until the correct location event and reference position $v$ are found. An error bit is only generated when the count of C is past T, any SKIP codewords have been disposed of (by finding their corresponding location event) and when that bit will have the decoded reference position with respect to the next location event. Positioning this error pel completes the decoding of a word and causes the process to repeat with fetch of the next codeword.

Referring now to FIGS. 5A–E, there is shown detailed logic implementations of error matrix generator 12, location matrix matrices 16, encoding select logic 69, raster matrix generator 12', and error positioning logic 69'.

In each of the figures, the functions recited in counterpart FIGS. 1 and 2 are implemented at the gate level. In this regard, the gate functions are those described in standard works such as M. Phister, *Logical Design of Digital Computers*, John Wiley & Sons, New York, 1958, LC58–6082, and McCluskey and Bartee, *A Survey of Switching Circuit Theory*, McGraw Hill Book Company, New York, 1962, LC62–10210.

Figure 5A:
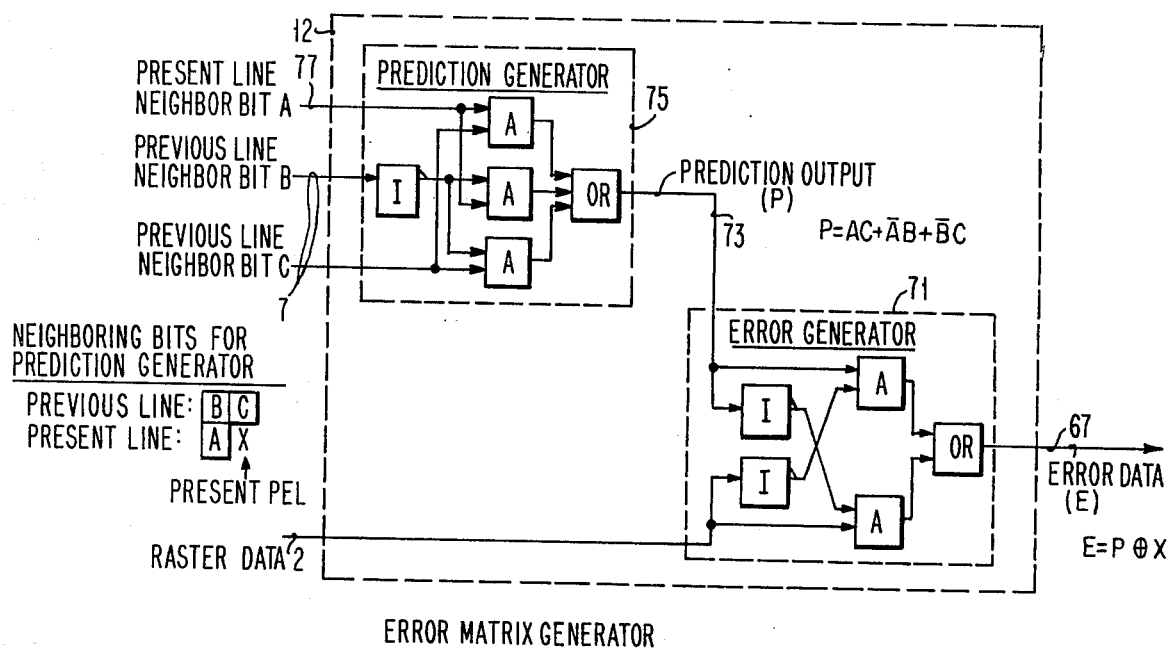

Referring now to FIGS. 5A and B, there are shown to one side bit or pel maps relating the position of neighboring pels in the present and previous raster scan lines with respect to the location of a present pel. Observe that pel A is the pel value immediately preceding the present pel X in the same scan line, while pels B, C, D, and E are positioned in the previous scan line with pel C centered over the present pel X. In this discussion, the term "bit" and "pel" will be used interchangeably.

FIG. 5A otherwise illustrates the means for generating the high-order $p \times q$ predictive error array. The error matrix generator 12 provides an error array on output path 67 on the basis of a pel-for-pel comparison match by error generator 71 between the prediction output on path 73 from prediction generator 75 and a corresponding pel obtained from raster data applied on path 2. In this regard, error generator 71 operates an an Exclusive OR gate such that a mismatch between pels on paths 73 and 2 results in a 1 on path 67, while a match results in a 0 on path 67.

Prediction generator 75 is logically shown as a third order pel predictor with neighbor pel A applied to path 77 and previous line neighbor pels B and C applied in parallel over multiple conductor path 7. In this regard, the logic for prediction generator 75 dictates a 1 output on path 73 if either pels A and C, A and $\bar{B}$, or $\bar{B}$ and C have a logical value of 1. For all other input combinations, the prediction generator 75 generates a zero on path 73.

Figure 5B:
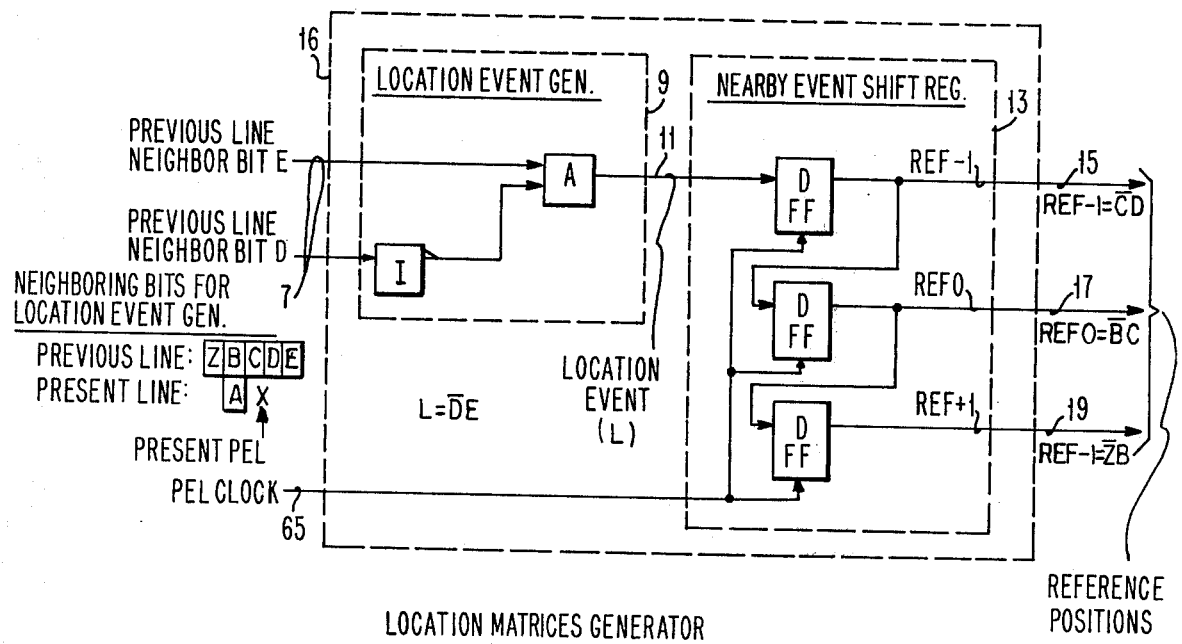

Referring now to FIG. 5B, the location matrices generator 16 is formed from location event generator 9 and nearby event shift register 13. The input to this generator is formed from previous line neighbor bits D and E applied in parallel over paths 7 to event generator 9. In this embodiment, the detected feature or location event of interest are left-hand edges. This occurs only when pel E is a 1 and pel D is a 0. The output from generator 9 is applied to shift register 13 over path 11. It will be further observed that the reference code −1, 0, and +1 values appear on respective lines 15, 17 and 19. The bits representing the location event are entered in the top register stage and are progressively shifted downward. This gives the appearance of being a window through which the location event is passing, for say, right to left.

Figure 5C:
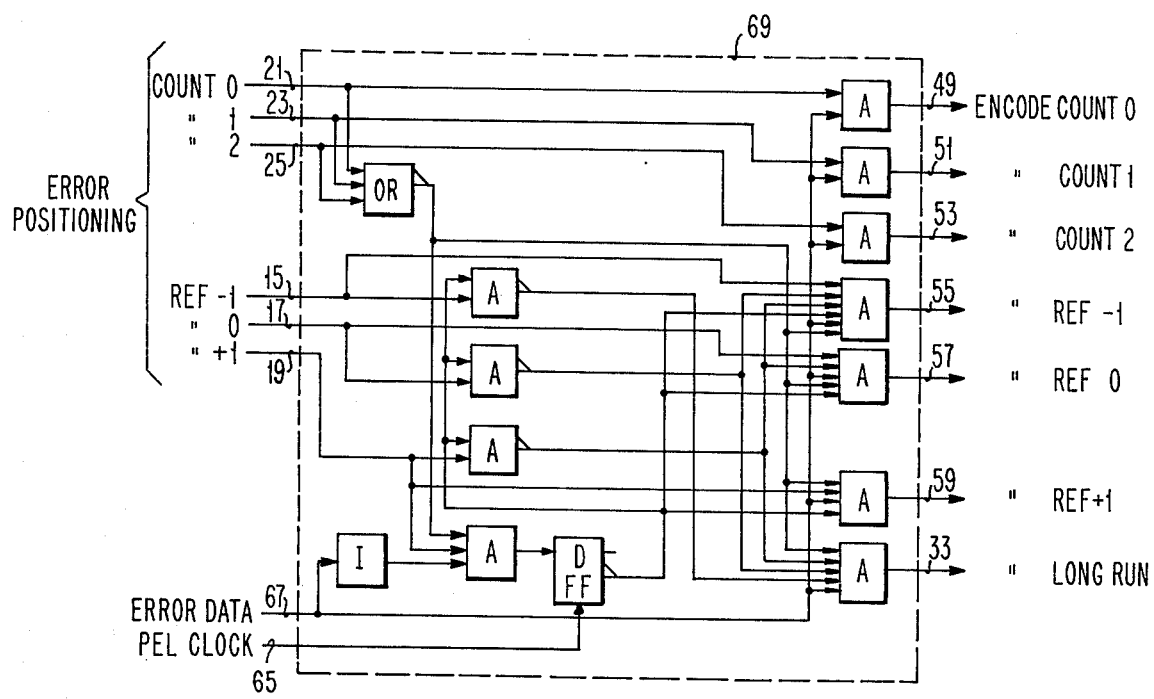

Referring now to FIG. 5C, there is shown encoding select logic 69. This logic is responsive to the error pels from error matrix generator 12 over path 67, location matrices generator 16 reference values over paths 15, 17 and 19 and run length counter 8 over respective paths 21, 23 and 25. Logic 69 has the function of selecting the encoding of a raster sequence either as short variable-length codewords or reference codewords at encoder 47 or as long variable-length codewords at encoder 31. It is necessary that a 1 on path 67 be present in order to condition the output AND gates driving the appropriate compression code condition. The other logic suppresses reference encodings until counts of 0, 1 or 2 are not present (T=2), implements the encoding priorities that REF=+1 supercedes REF=0 which supercedes REF=−1 and implements an inhibit on all REF encodings from a flip-flop that remembers if a REF=+1 passes by (since the last error pel on path 67) without being used (m=0).

Figure 5D:
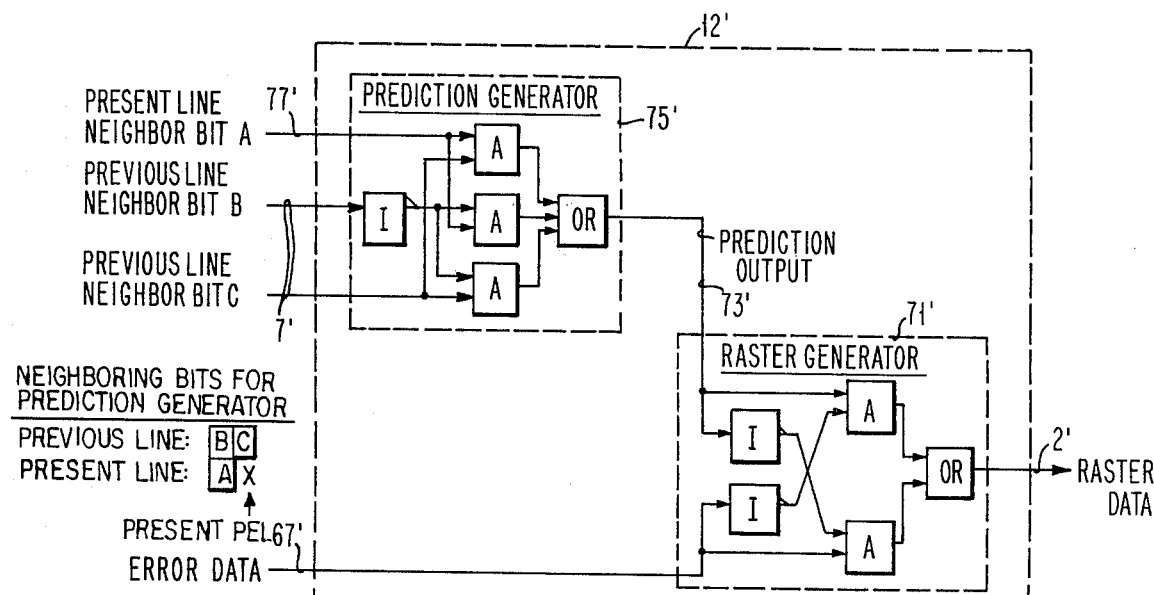

Referring now to FIG. 5D, there is shown the raster matrix generator 12' of decompression logic of FIG. 2. Matrix generator 12' consists of a prediction generator 75' and a raster generator 71'. Raster generator 71' is driven by the prediction generator over path 73' and error data from error position logic 69' over path 67'. The prediction output is corrected by error data using Exclusive OR gate logic of raster generator 71'. Restated, raster data appearing on path 2' from raster generator 71' will be a logical 1 when corresponding bits on paths 73' and 67' mismatch while generating a logical 0 when the bits match. The prediction generator 75' is shown as a third-order predictor driven by image memory 10'. Parenthetically, image memory 10' is filled from the output of the raster matrix generator.

The function, then, of prediction generator 75' is the same as that of prediction generator 75 with reference to in this case, synthesizing a $p \times q$ array of Boolean coded points.

Referring now to FIG. 5E, there is shown error position logic 69' of the decompression apparatus of FIG. 2. Error position logic 69' is the dual of encoding select logic 69 of the compressor of FIG. 1. Its function is to be responsive to the compression code words as ultimately decoded by variable length decoder 47', run-length counter 8', shift register 39', count compare logic 28, and location matrix generator 16' for providing a high-order $p \times q$ predictive error array, termed "error data" on path 67'. Error position logic 69' in the decompressor, in contrast to its dual 69 in the compressor, is a selection network in which the respective decoded compression codewords cause an error bit to be logically gated through to path 67', (rather than a network in which an error bit gates through encoded compression codewords to paths 49, 51, 53, 55, 57 and 59). In both 69 and 69' the time when this gating occurs is critical, being dependent on the error position at the compressor and determining the error position at the decompressor.

Referring again to FIGS. 2, it should be appreciated that the apparatus shown has the function of decoding compression code words presented on paths 43 and 45 so as to reconstruct a $p \times q$ array of Boolean coded points in consecutive raster soan lines on output path 2'. The apparatus comprises a memory 10' for storing a selected portion of the reconstructed $p \times q$ image array. This memory is updated from raster generator 71' as the decompression process progresses. Prediction generator 75' generates a $p \times q$ high-order prediction array from the memory stored data. In turn, the decoding means 14' is responsive to compression code words over paths 43 an 45 and to the generation of $p \times q$ location event arrays 15', 17', and 19' from said memory stored data in order to cross-array generate a $p \times q$ error array on path 67'. Raster generator 71' coupling both the high-order prediction and error array generating means reconstructs the $p \times q$ array of original image array pels by merely exclusively OR gating their values as previously described. It should be apparent that the synthesizing of the error array in terms of the participation of the run-length and reference encoded data is the exact dual of synthesizing the run-length and reference encoded data from the error array in the compressor shown in FIG. 1. Because the compression is uniquely and instantaneously decodable as defined in N. Abramson's, *Information Theory and Coding*, McGraw Hill Book Company, New York, 1963, the decompressor apparatus of FIG. 2 does not sustain difficulty in determining code word boundaries.

Figure 6:
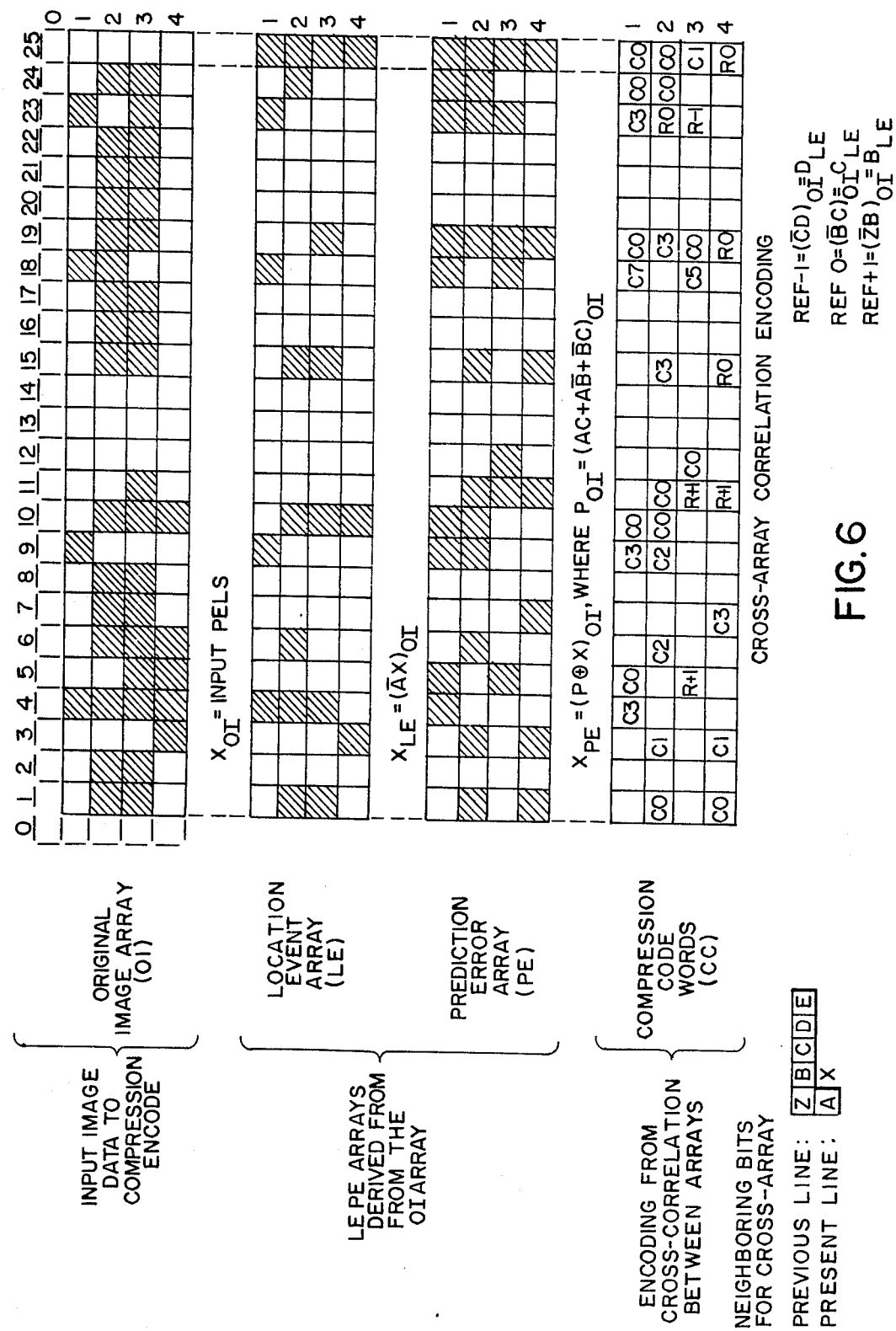
FIG. 6 represents a graphical visual comparison of several scan lines of two-valued picture points in a raster image matrix with scan lines derived therefrom forming respective error and location event matrices.

Referring now to FIG. 6, an example of an original image array (OI) comprising four raster scan lines of 25 pel positions each. Also shown are a location event array (LE) and a prediction error array (PE) derived from the original image array. Lastly, there is set forth an array of compressed codewords each of whose terms are selected as a function of the cross correlation between events in the PE and LE arrays.

The OI array includes an extra row and column of white pels indicated by dotted lines. This row and column is tutorial to indicate the 0-valued boundary conditions assumed in the derivation of pel values for the LE and PE arrays.

A present pel X in a present scan line of any array is related to its immediate prior pel A in the present scan line and to pels $Z_1$, B, C, D in the previous scan lines as indicated in the figure. One further note, the PE array requires that a prediction P first be formed and then logically combined with the X value from the OI array.

Referring now to the LE array, each present pel value $X_{LE}$ is obtained from the conjunction of $\bar{A}$ and X from the original image array, expressed in logic equation form as $X_{LE}=(\bar{A}\ X)_{OI}$. It should be noted that the present pel value for the first column in the LE array requires an input from the zeroeth (dotted) line column in the OI array, which is assumed to contain white input pels.

The row and column of an array pel position is denoted $(i,j)$. Thus, the second row, fifth column, pel position would be symbolized as (2,5). The second row, fifth column, pel position for the original image array would be depicted as OI(2,5). Similar notations apply to discussions of the other arrays.

It is desired now to derive the pel values at several locations in the LE array. Thus, for $X_{LE}$ at LE(1,1), one must logically combine the pel values for $\bar{A}_{OI}=\overline{OI(1,0)}=1$ and $X_{OI}=OI(1,1)=0$ according to the logical relationship of $X_{LE}=(\bar{A}\ X)_{OI}=1\cdot 0=0$=white event pel. The event pel value at LE(3,1) is determined by logically combining the pel values at OI(3,0) and OI(3,1). Here $X_{LE}=1\cdot 1=1$=black event pel. Similar tests can be applied to interior points. For example, $X_{LE}$ at LE(2,9) has its event pel value determined by the values in OI(2,8) and OI(2,9), such that $X_{LE}=0\cdot 0=0$.

The error pel values $X_{PE}$ in the prediction error array are formed from logically combining the predicted pel value derived from the original array with the input pel values in said original array. More particularly, they follow the logic equations $X_{PE}=(P\oplus X)_{OI}$ where $P=(AC+A\bar{B}+\bar{B}C)_{OI}$.

In order to analyze the error pel value of a position on the prediction error array, it is first necessary to obtain the predicted pel value $P_{OI}$. Thus, the predicted pel value at OI(1,1) consists of the logical combination of the input pel values at locations $A=OI(k,0)$, $B=OI(0,0)$, $C=OI(0,1)$. Since by inspection the three pel values are white=0, then $P_{OI}=0$. Since, in addition, $X_{OI}=0$ it follows directly that $X_{PE}=0\oplus 0=0$. The error pel value at PE(2,3) requires the logical combining of pel values at OI(2,2), OI(1,2) and OI(1,3). In this case, $P_{OI}=(1\cdot 0+1\cdot 1+1\cdot 0)=1$ and $X_{OI}=0$. Therefore, $X_{PE}=1\oplus 0=1$.

What so far has been described is the logical relationship between the derived arrays in respect to the original image array. As previously mentioned, the compressed code word utilizes the cross-correlation between values in the respective arrays.

What is described hereafter is the encoding of the image using these derived arrays and assuming $T=2, m=0$.

More particularly, with regard to FIGS. 5A and 5B, the output of the location event generator can be delayed and then output in terms of reference positions, i.e., REF−1, REF0, REF+1. This relationship is defined by the hardware, which implements the logic equations $REF-1=\overline{CD}$, $REF0=\overline{BC}$ and $REF+1=\overline{ZB}$.

In terms of FIG. 6, a simpler way of identifying reference positions is possible using of the location event array defined by $X_{LE}=(\overline{A}X)_{OI}$. Using this array definition at locations other than $X_{LE}$ results in the three important relationships $B_{LE}=(\overline{Z}B)_{OI}$, $C_{LE}=(\overline{B}C)_{OI}$ and $D_{LE}=(\overline{C}D)_{OI}$. These equate easily with the above logic equations defining reference positions and allow REF+1, REF0, REF−1 to be easily spotted by inspecting $B_{LE}$, $C_{LE}$ and $D_{LE}$ respectively. Thus, the correlation between prediction errors and location events is such that a prediction error at coordinates $PE(i,j)$ is in a REF+1 position, if there exists a location event pel at $LE(i-1,j-1)=B_{LE}=(\overline{Z}B)_{OI}=$ REF+1. Similarly, a prediction error at $PE(i,j)$ is in a REF0 position, if a location event pel is present at $LE(-1,j)=C_{LE}=(\overline{B}C)_{OI}=$ REF0. Lastly, a prediction error at $PE(i,j)$ is in a REF−1 position if the location event pel occurs at $LE(i-1,j+1)=D_{LE}=(\overline{C}D)_{OI}=REF-1$.

Significantly, a prediction error at coordinates PE-$(i,j)$ is also always at a run length counter position C, based upon the number of non-error pels between it and the previous error in the same scan line.

The codeword actually used is derived from (1) which of the above four positions a prediction error is simultaneously in, and (2) the encoding priorities between these positions defined by the flow chart in FIG. 3.

Referring now to FIG. 3 taken together with FIG. 6, the following illustrative examples relate the LE and PE arrays to the resultant codewords, derived with the method steps of FIG. 3.

Let us take the first example where the error pel of interest occurs at PE(2,5) The previous pel occurs at PE(2,3) such that C=2. Furthermore, the threshold T=2. Since C is not greater than T, then according to FIG. 3, the runlength codeword "C2" must be sent. Observe that in FIG. 6 this codeword is shown at position (2,6) in the CC array.

An interesting example occurs at error pel position $X_{PE}=PE(3,11)$. Here, C=5, the previous error occurring at PE(3,5). This means that C is greater than T, and any REF positions are useable. In the LE array, a black event pel occurs at $LE(2,10)=B_{LE}$ and hence a REF+1 position exists. However, black event pels do not occur at $LE(2,11)=C_{LE}$ or $LE(2,12)=D_{LE}$ and the error pel is not in a REF0 or REF−1 position. Thus, according to FIG. 3, the REF+1 has priority over the C=5 position and consequently a "R+1" codeword is sent.

The next error pel in the third PE scan line occurs at PE(3,12). Here C=0. With regard to FIG. 3, this again means that C<T=2 and the runlength codeword is transmitted, CC(3,12)="C0".

Suppose an error occurred in the PE array at PE(1,4). Here, C=3. However, reference must be made to a fictitious previous raster scan line in the LE array which is treated as consisting of all white pels. Since there are no event errors in the LE array within the window of LE(0,3), LE(0,4) or LE(0,5), then only a runlength position is available. Hence, the lowermost flowchart path in FIG. 3 is taken and the runlength codeword "C3" is recorded in array position CC(1,4).

The next example occurs in the PE array at PE(3,23). Here C=3. A relevant event error in the LE array only occurs at $D_{LE}=LE(2,24)$. This is in the REF−1 position. Since C is greater than T, then the "R−1" codeword has priority and is sent out.

Having thus described in detail a preferred embodiment of the inventive system, a person skilled in the art will be able to modify certain of the structure and steps which have been disclosed and to substitute equivalent elements for those illustrated while continuing to practice the invention. It is therefore intended that all such modifications and substitutions be covered as they are embraced within the spirit and scope of the appended claims.

What is claimed is:

1. An apparatus for compression coding a $p \times q$ array of Boolean coded points applied to the apparatus in consecutive raster scan lines, said apparatus comprising:

means (10, 12, 9) for forming a high-order $p \times q$ prediction error array and an auxilliary $p \times q$ array of location events from the consecutive raster scan lines of the $p \times q$ array of Boolean coded points;

means (8, 12, 61, 65, 63) for counting runs C between consecutive pairs of errors in the prediction error array;

means (14) for forming a line difference codeword with difference value $v$ upon the joint event of C>T where T is a threshold and either the single or multiple occurrence of location events in the $i$th-1 scan line of the location event array within the bit position range of $B \leq r \leq (j+n)$, where positive integer B is the greater of function $D(T,v)$ and $(j-n)$, and the number of intervening location events, $s$, within the bit position range from search start position $D(T,v) \leq q<(j-n)$ not exceeding some limit $m$, where $m$, $n$, $q$, $r$ and $s$ are positive integers; and means (14) for forming a compression code word from the run-length count C between consecutive errors, in response to the occurrence of each error in the $j$th bit position of the $i$th scan line of the prediction error array upon either $C \leq T$ or C>T and there being no occurrence of a line difference encoding for the error, where $i$, $j$, C and T are positive integers.

2. An apparatus according to claim 1, wherein said apparatus further comprises;

means (9,13,16) for generating line difference codes with value v $(-n,-(n-1), -1,0, +1, (n-1), n)$ responsive to the correlation between the pel position between a location event in the $i$th−1 scan line of the location event array and an error in the $i$th scan line of the error array within a predetermined number $n$ of pel positions.

3. An apparatus according to claim 1, where $D(T,v)=(j-C+T+l)$.

4. An apparatus according to claim 1, wherein the means for generating the prediction error array comprises:

memory means (10) for storing consecutive raster scan lines of the original $p \times q$ array;

means (75) for reading the neighboring pel values of the present and previous raster scan lines from the memory (10) for predicting the $j$th pel value for the $i$th scan line;

means (71) for generating a binary 1 given the non-correspondence between the actual pel value for the $j$th position of the $i$th scan line of the original array and the predicted value and for generating a binary 0 otherwise.

5. An apparatus according to claim 4 wherein the means for high-order prediction includes a third order pel predictor.

6. An apparatus for compression coding a $p \times q$ array of Boolean coded points, termed "pels", said coded points or pels being applied to the apparatus in consecutive raster scan lines, said apparatus comprising:

means for deriving from the $p \times q$ array of Boolean coded points, a $p \times q$ array of high-order prediction errors; and an auxilliary $p \times q$ array of location events such as raster leading edges of all the objects in the image;

means for counting run-lengths C between consecutive pairs of errors in the prediction error array;

means responsive to each high-order prediction error for variable length encoding the most compression efficient of a first codeword and a second codeword, or in the absence of a first codeword encoding with the second codeword;

means for forming a first codeword upon there being an unambiguous correlation between a prediction error in the $i$th scan line of the prediction error array and a location event in the $i$th or $i$th -1 scan line of the location event array within a predetermined number of pel positions from the prediction error; and means for forming a second codeword from the run-length C between a prediction error and the preceding prediction error in the same scan line.

7. An apparatus according to claim 6, wherein the means responsive to each high-order prediction error for variable length encoding the most compression efficient of a first and a second codeword includes:

means for selecting the shorter of said first and second codewords.

8. An apparatus according to claim 6, wherein the means for deriving from the $p \times q$ array of Boolean coded points, a $p \times q$ prediction error array and a $p \times q$ location event array comprise:

means for dimensioning each derived array into $p$ rows and $q+n+1$ columns by including in the $n+1$ extra positions, columns of dummy errors or location events respectively;

said means for forming the first codewords being responsive to the occurrence of dummy errors and location events in the $n+1$ extra pel positions of the $i$th and $i$th-1 scan lines of the respective error and event arrays for increasing the relative frequency of first word encodings of those error array scan lines otherwise encoded as a second codeword at the end of line.

9. An apparatus for compression coding of a $p \times q$ array of Boolean coded points, the array points being serially applied to the apparatus in consecutive raster scan lines comprising:

means responsive to the consecutive raster scan lines for deriving a respective high-order and low-order $p \times q$ prediction error location event array;

means (14) for forming a line difference codeword with difference value $v$ upon the joint event of C>T where T is a threshold and either the single or multiple occurrence of location events in the $i$th-1 scan line of the location event array within the bit position range of $B \leq r \leq (j+n)$, where positive integer B is the greater of function $D(T,v)$ and $(j-n)$, and the number of intervening events, $s$, within the bit position range from search start position $D(T,v) \leq q<(j-n)$ not exceeding a limit $m$, where $m$, $n$, $q$, $r$ and $s$ are positive integers; and means (14) for forming a compression code word from the run-length count C between consecutive errors, in response to the occurrence of each error in the $j$th bit position of the $i$th scan line of the prediction error array upon either $C \leq T$ or C>T and there being no occurrence of a line difference encoding for the error, where $i$, $j$, C and T are positive integers.

10. An apparatus (FIGS. 2) for decoding compression code words so as to reconstruct a $p \times q$ array of Boolean coded points in consecutive raster scan lines, said apparatus comprising:

memory means (10') for storing a $p \times q$ array of Boolean coded points;

means (7', 77', 75') for generating a $p \times q$ prediction array from the memory stored array;

means (7', 77', 9') for generating a $p \times q$ location event array from the memory stored array means (14', 67') responsive to successive compression code words for generating a $p \times q$ prediction error array;

means (71') coupling the prediction array and predictive error array generating means for generating a $p \times q$ array of Boolean coded points wherein each Boolean coded point at array coordinates $i, j$ represents a value of a first kind upon there being a mismatch of values at corresponding $i, j$ coordinates between the prediction and predictive error arrays, and a value of a second kind upon there being a match of values at said array coordinates; and means (2') for updating the memory from the output of the Boolean coded array generating means.

11. An apparatus according to claim 10, wherein the means for generating a $p \times q$ location event array include:

means (9') for detecting the leading edge of an object disposed in the memory stored array.

* * * * *